(12) United States Patent
Karasawa

(10) Patent No.: US 8,345,346 B2
(45) Date of Patent: Jan. 1, 2013

(54) ELECTROPHORETIC DISPLAY

(75) Inventor: Junichi Karasawa, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 133 days.

(21) Appl. No.: 13/080,973

(22) Filed: Apr. 6, 2011

(65) Prior Publication Data
US 2011/0249316 A1 Oct. 13, 2011

(30) Foreign Application Priority Data

Apr. 8, 2010 (JP) ................................. 2010-089675

(51) Int. Cl.
G02B 26/00 (2006.01)
(52) U.S. Cl. ...................................... 359/296
(58) Field of Classification Search .................. 359/296; 345/107
See application file for complete search history.

(56) References Cited

U.S. PATENT DOCUMENTS

| 4,123,374 | A | * | 10/1978 | Gilliams et al. | ............... | 430/114 |
| 7,248,395 | B2 | | 7/2007 | Komatsu | | |
| 2010/0007941 | A1 | | 1/2010 | Abe et al. | | |

FOREIGN PATENT DOCUMENTS

| JP | A-2001-188267 | 7/2001 |
| JP | A-2006-235013 | 9/2006 |
| JP | A-2010-020231 | 1/2010 |
| WO | WO 2004/088395 A2 | 10/2004 |

* cited by examiner

*Primary Examiner* — David N Spector
(74) *Attorney, Agent, or Firm* — Oliff & Berridge, PLC

(57) ABSTRACT

An electrophoretic display includes first electrodes, a second electrode placed opposite the first electrodes, and a microcapsule layer placed between the first electrodes and the second electrode. The microcapsule layer contains microcapsules containing a dispersion medium and electrophoretic particles and a binder for retaining the microcapsules between the first electrodes and the second electrode. The electrophoretic particles are sealed in each microcapsule in such a state that the electrophoretic particles are dispersed in the dispersion medium. The following inequality is satisfied:

$$(\rho 2 \cdot \in 2)/(\rho 1 \cdot \in 1) < 1 \qquad (\alpha)$$

where $\rho 1$ is the resistivity of the dispersion medium, $\in 1$ is the dielectric constant of the dispersion medium, $\rho 2$ is the resistivity of the binder, and $\in 2$ is the dielectric constant of the binder.

3 Claims, 7 Drawing Sheets

FIG. 5

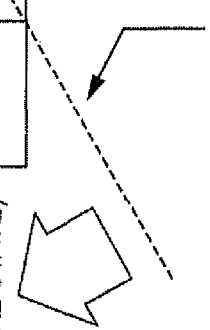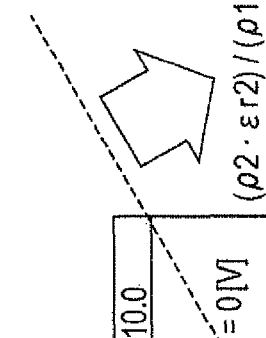

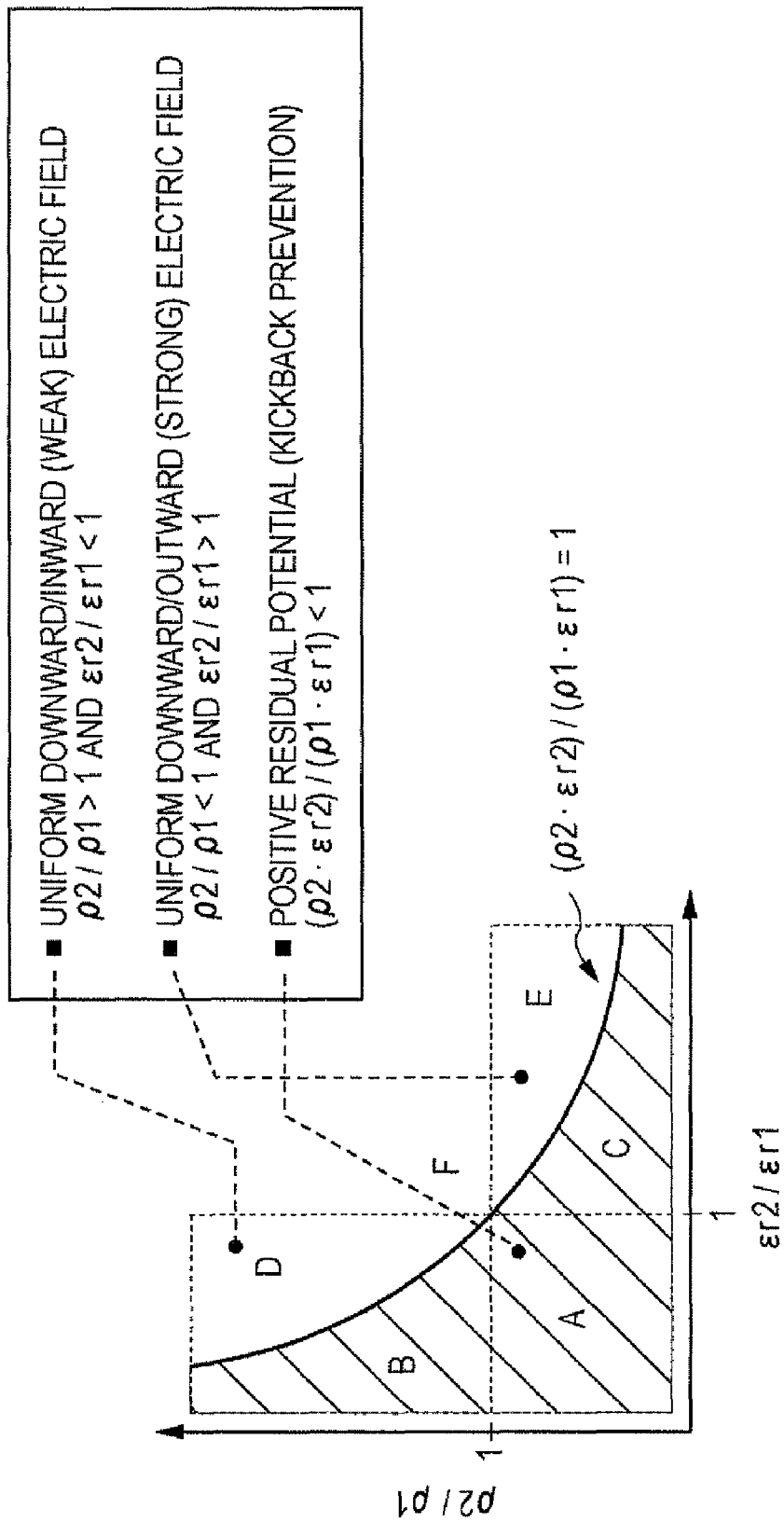

ELECTROPHORETIC DISPLAY

CROSS-REFERENCE TO RELATED APPLICATION

This application is based on and claims priority from Japanese Patent Application No. 2010-089675, filed on Apr. 8, 2010, the contents of which are incorporated herein by reference.

BACKGROUND

1. Technical Field

The present invention relates to an electrophoretic display.

2. Related Art

One of displays is an electrophoretic display which performs display in such a manner that charged particles (that is, electrophoretic particles) dispersed in a dispersion medium contained in microcapsules are electrophoretically moved with electric fields generated between electrodes and the distribution of the charged particles is controlled. In general, such an electrophoretic display has a structural advantage in that the electrophoretic display is suitable for thickness reduction because electrophoretic particles have high reflectivity and therefore any light source such as a front light is not necessary and also has a qualitative advantage in that the electrophoretic display has a large viewing angle and high contrast. Furthermore, the electrophoretic display has an advantage in that the electrophoretic display is suitable for low power consumption because any back light is not necessary or a voltage need not be applied between electrodes for the purpose of retaining a display state. Because of these advantages, the electrophoretic display is attracting much attention as a next-generation display device and is under active development (see, for example, JP-A-2010-20231).

In order to allow the electrophoretic display to quickly perform display switching (that is, high response) or to have increased display contrast, a large electric field needs to be generated between electrodes. Furthermore, the electrophoretic display is required such that a display state is retained as long as possible after the application of a voltage is stopped.

However, for electrophoretic displays having microcapsules (that is, a capsule structure), the following guidelines have not been established or specified: guidelines specifying what electrical properties materials used inside and outside the microcapsules should have in order to increase the intensity of electric fields in the microcapsules or in order to increase the retainability of a display state.

SUMMARY

An advantage of some aspects of the invention is to provide an electrophoretic display capable of increasing the retainability of a display state by specifying electrical properties that materials used in the inside and outside of microcapsules should have.

An electrophoretic display according to an embodiment of the invention includes first electrodes, a second electrode placed opposite the first electrodes, and a microcapsule layer placed between the first electrodes and the second electrode. The microcapsule layer contains microcapsules containing a dispersion medium and electrophoretic particles and a binder for retaining the microcapsules between the first electrodes and the second electrode. The electrophoretic particles are sealed in each microcapsule in such a state that the electrophoretic particles are dispersed in the dispersion medium. The following inequality is satisfied:

$$(\rho_2 \cdot \in_2)/(\rho_1 \cdot \in_1) < 1 \tag{$\alpha$}$$

where $\rho_1$ is the resistivity of the dispersion medium, $\in_1$ is the dielectric constant of the dispersion medium, $\rho_2$ is the resistivity of the binder, and $\in_2$ is the dielectric constant of the binder.

This configuration allows a positive rest potential (that is, the same polarity as that of an applied voltage) to be caused in the microcapsule layer immediately after the application of a voltage to the microcapsule layer is stopped (that is, at the end of the application of a voltage to the microcapsule layer). The rest potential can prevent the electrophoretic particles in the microcapsules from migrating in the direction opposite to the direction of an applied voltage. When the rest potential is large, the electrophoretic particles can be attracted in the same direction as that of an applied voltage. This is capable of increasing the retainability of a display state. The first electrodes correspond to, for example, pixel electrodes 31 below. The second electrode corresponds to a counter electrode 32 below.

In the electrophoretic display, the following inequality is satisfied:

$$\rho_2/\rho_1 < 1 \tag{$\beta$}$$

This allows the electric field intensity inside the microcapsules to be greater than the electric field intensity outside the microcapsules while a voltage is applied to the microcapsule layer and the potential of the microcapsule layer is stable (that is, a steady-state period). That is, the electric field intensity of the dispersion medium can be increased above the electric field intensity of the binder during such a steady-state period. This allows the electrophoretic particles to migrate efficiently and therefore allows, for example, the contrast of display to be increased.

In the electrophoretic display, the following inequality is satisfied:

$$\in_2/\in_1 < 1 \tag{$\gamma$}$$

This allows the electric field intensity inside the microcapsules to be greater than the electric field intensity outside the microcapsules immediately after the application of a voltage to the microcapsule layer is started (that is, at the beginning of the application of a voltage to the microcapsule layer). That is, the electric field intensity of the dispersion medium can be increased above the electric field intensity of the binder at the beginning of the application of a voltage to the microcapsule layer. This allows the electrophoretic particles to migrate efficiently and therefore allows, for example, display switching to be quickly performed.

BRIEF DESCRIPTION OF THE DRAWINGS

The invention will be described with reference to the accompanying drawings, wherein like numbers reference like elements.

FIG. 5 is a graph showing simulation results obtained at the beginning of the application of a voltage.

FIG. 7 is a graph showing simulation results obtained at the end of the application of a voltage.

FIG. 8 is a graph showing guidelines, obtained from the above simulation results, for selecting materials.

DESCRIPTION OF EXEMPLARY EMBODIMENTS

Figure 1:
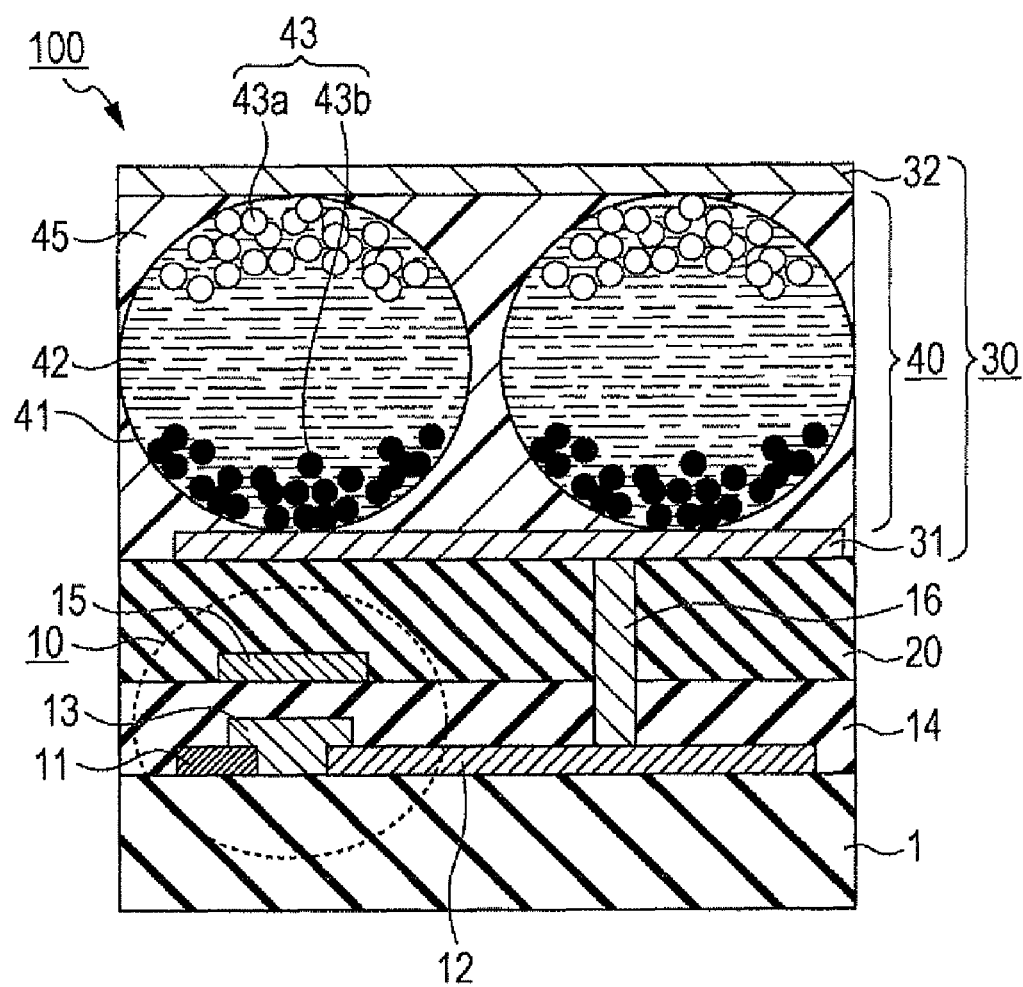
FIG. 1 is a sectional view of an electrophoretic display according to an embodiment of the invention.

Embodiments of the invention will now be described with reference to the accompanying drawings. Members having the same configurations are denoted by the same reference numerals in the drawings and will not be redundantly described.

(1) Configuration

FIG. 1 is a sectional view of an electrophoretic display 100 according to an embodiment of the invention. With reference to FIG. 1, the electrophoretic display 100 includes an insulating substrate 1, pixel transistors 10 arranged on the insulating substrate 1, an interlayer insulating layer 20 extending over the pixel transistors 10, and a display panel 30 disposed on the interlayer insulating layer 20.

The insulating substrate 1 supports the pixel transistors 10 and the display panel 30 and is a substrate (that is, a resin substrate) made of, for example, a resin material such as polycarbonate (PC) or polyethylene terephthalate (PET), a glass substrate, or the like. When electrophoretic display 100 is flexible, the insulating substrate 1 is a flexible resin substrate.

The pixel transistors 10 are organic transistors, including active layers made of an organic semiconductor, referred to as a top-gate/bottom-contact (TG/BC) thin-film transistor. The pixel transistors 10 each include a source electrode 11 disposed on the insulating substrate 1; a drain electrode 12 disposed on the insulating substrate 1; an organic semiconductor layer 13 which is disposed on the insulating substrate 1 so as to fill a gap between the source electrode 11 and the drain electrode 12; a gate insulating layer 14 which is disposed on the insulating substrate 1 so as to cover the organic semiconductor layer 13, the source electrode 11, and the drain electrode 12; and a gate electrode 15 disposed above the organic semiconductor layer 13 with the gate insulating layer 14 extending therebetween.

The source electrode 11 and the drain electrode 12 are made of, for example, gold (Au). The organic semiconductor layer 13 is made of, for example, F8T2, which is a fluorene-bithiophene copolymer, a derivative (that is, a compound having a modified moiety) thereof, or the like. The gate insulating layer 14 is made of, for example, syndiotactic polypropylene, polybutene-1, or the like. The gate electrode 15 is made of, for example, Au, aluminum (Al), or the like.

In the electrophoretic display 100, the source electrodes 11 are connected to, for example, data lines (not shown) and the drain electrodes 12 are connected to the display panel 30 through interconnections 16 disposed in contact holes. The gate electrodes 15 are connected to scanning lines (not shown).

The interlayer insulating layer 20 is made of, for example, an organic material such as polyimide, an inorganic material such as silicon dioxide, or the like.

The display panel 30 includes pixel electrodes 31 which are disposed on the interlayer insulating layer 20 and which are connected to the interconnections 16, a microcapsule layer 40 which is disposed on the interlayer insulating layer 20 so as to cover the pixel electrodes 31, and a counter electrode 32 disposed on the microcapsule layer 40.

The pixel electrodes 31 are separate electrodes arranged in, for example, a matrix (an array) in plan view, which is not shown. The counter electrode 32 is, for example, a common electrode continuously extending over the pixel electrodes 31. In the display panel 30, a portion where the counter electrode 32 and one of the pixel electrodes 31 overlap with each other corresponds to a pixel and an image, a character, or the like is displayed on the counter electrode 32 side.

The pixel electrodes 31 are made of, for example, Al or a transparent electrode material such as indium tin oxide (ITO), which is a compound prepared by doping indium oxide with tin. The counter electrode 32 is located on a display surface side and is made of, for example, a transparent electrode material such as ITO.

The microcapsule layer 40 contains a plurality of microcapsules 41 and a binder 45 for retaining the microcapsules 41 between the pixel electrodes 31 and the counter electrode 32. The microcapsules 41 are horizontally arranged to form, for example, a single layer in sectional view (one by one without overlapping with each other in the thickness direction).

The microcapsules 41 each have, for example, substantially a spherical shape and have a diameter of about 40 μm. The microcapsules 41 each include a body (that is, a shell) which is an extremely thin film and which is made of, for example, at least one of resin materials such as melamine resins, epoxy resins, urethane resins, urea resins, polyamides, and polyethers, which may be used alone or in combination.

The microcapsules 41 are filled with a dispersion medium (that is, a dispersion liquid) 42. The dispersion medium 42 is one unlikely to dissolve the bodies of the microcapsules 41 and electrophoretic particles below. An example of the dispersion medium 42 is a silicone solvent.

Examples of the dispersion medium 42 include various water products such as distillated water, pure water, ion-exchanged water, and reverse osmosis-purified (RO) water; alcohols such as methanol, ethanol, isopropanol, butanol, octanol, ethylene glycol, diethylene glycol, and glycerin; cellosolves such as methyl cellosolve, ethyl cellosolve, and phenyl cellosolve; esters such as methyl acetate, ethyl acetate, butyl acetate, and ethyl formate; ketones such as acetone, methyl ethyl ketone, diethyl ketone, methyl isobutyl ketone, methyl isopropyl ketone, and cyclohexanone; aliphatic hydrocarbons (liquid paraffins) such as pentane, hexane, and octane; alicyclic hydrocarbons such as cyclohexane and methylcyclohexane; aromatic hydrocarbons such as benzene, toluene, xylene, and long-chain alkyl benzenes including hexylbenzene, heptylbenzene, octylbenzene, nonylbenzene, decylbenzene, undecylbenzene, dodecylbenzene, tridecylbenzene, and tetradecylbenzene; 9 halohydrocarbons such as methylene chloride, chloroform, carbon tetrachloride, and 1,2-dichloroethane; heteroaromatics such as pyridine, pyrazine, furan, pyrrole, thiophene, and methylpyrrolidone; nitriles such as acetonitrile, propionitrile, and acrylonitrile; amides such as N,N-dimethylformamide and N,N-dimethylacetamide; carboxylates; and various oils. These compounds may be used alone or in combination.

A plurality of electrophoretic particles 43 are sealed in each microcapsule 41 in such a state that the electrophoretic particles 43 are dispersed in the dispersion medium 42. The electrophoretic particles 43 are, for example, white particles 43a and black particles 43b. The white particles 43a are, for example, positively charged. The black particles 43b are, for example, negatively charged. When electric fields act on the microcapsules 41, the white particles 43a and the black particles 43b electrophoretically migrate in different directions. The white particles 43a are made of, for example, titanium oxide ($TiO_x$). The black particles 43b are made of, for example, titanium oxynitride ($TiO_xN_y$). The electrophoretic particles 43 may be metal particles, metal oxide particles, pigment particles, or resin particles other than titanium oxide particles or titanium oxynitride particles. The electrophoretic particles 43 are substantially spherical and have a size of, for example, about 20 nm to 300 nm.

The binder 45 is an insulating resin and functions as, for example, an adhesive for retaining the microcapsules 41. An example of the binder 45 is an acrylic solvent.

Examples of the binder 45 include, in addition to the acrylic solvent, thermoplastic resins such as polyethylene, chlorinated polyethylene, ethylene-vinyl acetate copolymers, ethylene-ethyl acrylate copolymers, polypropylene, AS resins, ABS resins, polymethyl methacrylate, polyvinyl chloride, vinyl chloride-vinyl acetate copolymers, vinyl chloride-vinylidene chloride copolymers, vinyl chloride-acrylic ester copolymers, vinyl chloride-methacrylic acid copolymers, vinyl chloride-acrylonitrile copolymers, ethylene-vinyl alcohol-vinyl chloride copolymers, propylene-vinyl chloride copolymers, polyvinylidene chloride, polyvinyl acetate, polyvinyl alcohol, polyvinyl formal, and cellulose resins; polymers such as polymers such as polyamide, polyacetal, polycarbonate, polyethylene terephthalate, polybuthylene terephthalate, polyphenylene oxide, polysulfone, polyamidoimide, polyaminobismaleimide, polyethersulfone, polyphenylenesulfone, polyarylate, grafted polyphenylene ether, polyether-ether ketone, and polyetherimide; fluorocarbon resins such as polytetrafluoroethylene, fluorinated ethylene-propylene copolymers, tetrafluoroethylene-perfluoroalkoxyethylene copolymers, ethylene-tetrafluoroethylene copolymers, polyfluorovinylidene, polytrifluorochloroethylene, and fluorocarbon rubber; silicones such as silicone resins and silicone rubber; urethane resins such as polyurethane; and other polymers such as methacrylic acid-styrene copolymers, polybutylene, and methyl methacrylate-butadiene-styrene copolymers. These materials may be used alone or in combination. Alternatively, one or more of these materials are used in such a state that one or more of these materials are dissolved in a solvent (that is, a solvent state) as required.

In this embodiment, the electrophoretic display 100 has a structure in which two of the microcapsules 41 are placed on each of the pixel electrodes 31 as shown in FIG. 1. This is merely an example. In the electrophoretic display 100, one of the microcapsules 41 may be placed on each of the pixel electrodes 31, three or more of the microcapsules 41 may be placed on each of the pixel electrodes 31, or one of the microcapsules 41 may be placed astride two of the neighboring pixel electrodes 31.

With reference to FIG. 1, the microcapsules 41 are in contact with both the counter electrode 32 and the pixel electrodes 31. This is merely an example. In the electrophoretic display 100, the microcapsules 41 may be in contact with either the counter electrode 32 or the pixel electrodes 31. With reference to FIG. 1, the microcapsules 41 are spaced from each other. This is merely an example. In the electrophoretic display 100, the microcapsules 41 may be arranged in contact with each other.

(2) Electrical Properties

In the electrophoretic display 100, the dispersion medium 42 and the binder 45 are selected such that $\epsilon 1, \rho 1, \epsilon 2$, and $\rho 2$ satisfy the following inequality:

$$(\rho 2 \cdot \epsilon 2)/(\rho 1 \cdot \epsilon 1) < 1 \quad (\alpha)$$

wherein $\epsilon 1$ is the dielectric constant of the dispersion medium 42, $\rho 1$ is the resistivity of the dispersion medium 42, $\epsilon 2$ is the dielectric constant of the binder 45, and $\rho 2$ is the resistivity of the binder 45 (or wherein $\epsilon 1$ is the relative dielectric constant $\epsilon r1$ of the dispersion medium 42 and $\epsilon 2$ is the relative dielectric constant $\epsilon r2$ of the binder 45).

This allows a positive rest potential (that is, the same polarity as that of an applied voltage) to be caused in the microcapsule layer 40 immediately after the application of a voltage to the microcapsule layer 40 is stopped (that is, at the end of the application of a voltage to the microcapsule layer 40) as described in paragraphs entitled "(3) Experiments and results". The rest potential can prevent the electrophoretic particles 43 in the microcapsules 41 from migrating in the direction opposite to the direction of an applied voltage. When the rest potential is large, the electrophoretic particles 43 can be attracted in the same direction as that of an applied voltage. This is capable of increasing the retainability of a display state in the display panel 30. Regions A, B, and C shown in FIG. 8 satisfy Inequality ($\alpha$).

In this embodiment, the dispersion medium 42 and the binder 45 are preferably selected such that $\epsilon 1, \rho 1, \epsilon 2$, and $\rho 2$ satisfy the following inequality in addition to Inequality ($\alpha$):

$$\rho 2/\rho 1 < 1 \quad (\beta)$$

This allows the electric field intensity inside the microcapsules 41 to be greater than the electric field intensity outside the microcapsules 41 while a voltage is applied to the microcapsule layer 40 and the potential of the microcapsule layer 40 is stable (that is, a steady-state period) as described in the paragraphs entitled "(3) Experiments and results". That is, the electric field intensity of the dispersion medium 42 can be increased above the electric field intensity of the binder 45 during such a steady-state period. This allows the electrophoretic particles 43 to migrate efficiently and therefore allows the display panel 30 to have, for example, increased contrast. Regions A and C shown in FIG. 8 satisfy Inequalities ($\alpha$) and ($\beta$).

In this embodiment, the dispersion medium 42 and the binder 45 are preferably selected such that $\epsilon 1, \rho 1, \epsilon 2$, and $\rho 2$ satisfy the following inequality in addition to Inequalities ($\alpha$) and ($\beta$):

$$\epsilon 2/\epsilon 1 < 1 \quad (\gamma)$$

This allows the electric field intensity inside the microcapsules 41 to be greater than the electric field intensity outside the microcapsules 41 immediately after the application of a voltage to the microcapsule layer 40 is started (that is, at the beginning of the application of a voltage to the microcapsule layer 40) as described in the paragraphs entitled "(3) Experiments and results". That is, the electric field intensity of the dispersion medium 42 can be increased above the electric field intensity of the binder 45 at the beginning of the application of a voltage to the microcapsule layer 40. This allows the electrophoretic particles 43 to migrate efficiently and therefore allows the display panel 30 to quickly perform display switching. Region C shown in FIG. 8 satisfies Inequalities ($\alpha$), ($\beta$), and ($\gamma$).

The dielectric constant $\epsilon 1$ of the dispersion medium 42 can be adjusted within a certain range in such a manner that, for example, an adjustor such as a ketone, a carboxylic acid, or an alcohol such as 1,2-butanediol or 1,4-butanediol is added to the dispersion medium 42 in addition to the choice of the above materials. The resistivity $\rho 1$ of the dispersion medium 42 can be adjusted within a certain range in such a manner that an appropriate adjustor is added to the dispersion medium 42 in addition to the choice of the above materials.

Likewise, the dielectric constant $\epsilon 2$ of the binder 45 can be adjusted within a certain range in such a manner that, for example, an adjustor such as a ketone, a carboxylic acid, or an alcohol such as 1,2-butanediol or 1,4-butanediol is added to the binder 45 in addition to the choice of the above materials. The resistivity $\rho 2$ of the binder 45 can be adjusted within a certain range in such a manner that an appropriate adjustor is added to the binder 45 in addition to the choice of the above materials.

(3) Experiments and Results (I) Factors Determining Electric Field

In the case of actually using an electrophoretic display, a voltage is applied to a microcapsule layer sandwiched between pixel electrodes (hereinafter referred to as lower electrodes in some cases) and a counter electrode (hereinafter referred to as an upper electrode in some cases) for a short time. In this case, the electric field inside each microcapsule behaves as a dynamic electric field which is nonuniform and which varies with time. The inventors have focused on Items (a) to (c) below, which are factors determining the electric field inside the microcapsule.

(a) The waveform of the voltage applied to the microcapsule layer.

(b) Electrical properties of materials contained in the microcapsule layer (that is, electric material constants such as dielectric constant $\in$ (F/m) and resistivity $\rho$ ($\Omega$m)).

(c) Three-dimensional shape of the microcapsule layer.

The inventors have simulated the microcapsule layer for potential distribution and electric field distribution variable with time using a three-dimensional electric field transient response simulator in such a manner that electrical properties (relative dielectric constant $\in$r and resistivity $\rho$ ($\Omega$m)) of materials contained in the electrophoretic display are varied. In this simulation, the shape and size of a simulation model used were set as described below.

(II) Simulation Conditions

Figure 2A:
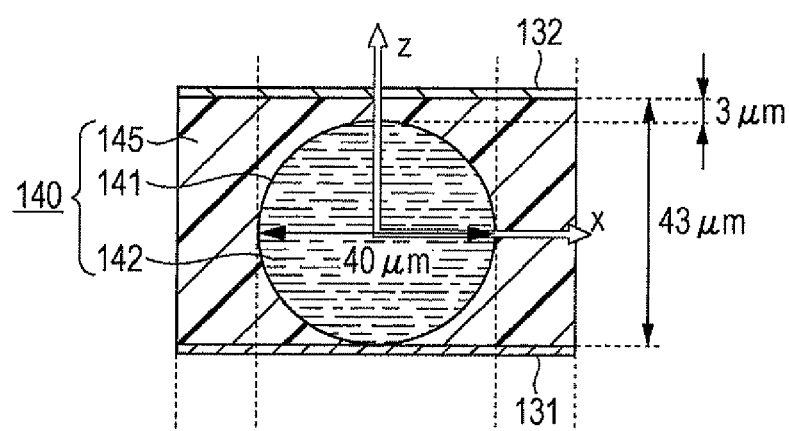
FIG. 2A is a sectional view of a microcapsule layer which corresponds to a simulation model.
Figure 2B:
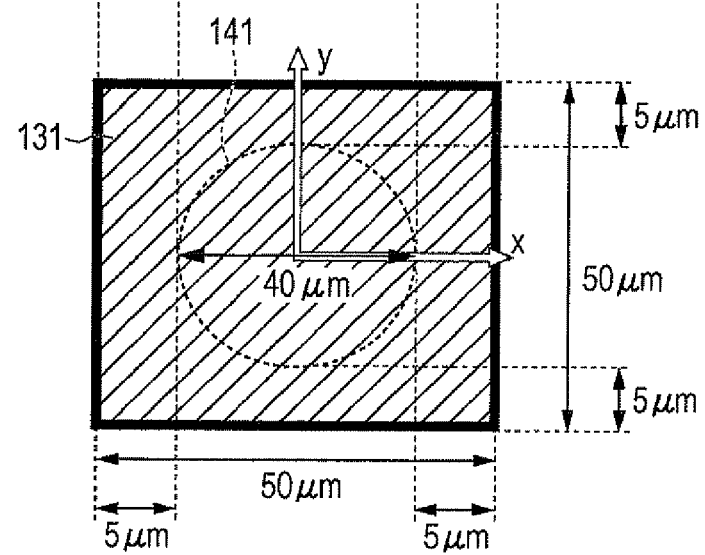
FIG. 2B is a plan view of the microcapsule layer shown in FIG. 2A.

FIG. 2A is a sectional view of a microcapsule layer 140 which corresponds to the simulation model. FIG. 2B is a plan view of the microcapsule layer 140.

In this simulation, the distance between an upper electrode 132 and a lower electrode 131 in the thickness direction (that is, a z-direction) was set to 43 μm as shown in FIG. 2A. The microcapsule layer 140 was set so as to be located therebetween. The longitudinal length (that is, the length in a y-direction) and lateral length (that is, the length in an x-direction) of the upper and lower electrodes 132 and 131 were set to 50 μm and 50 μm, respectively, in plan view as shown in FIG. 2B.

As shown in FIGS. 2A and 2B, a microcapsule 141 was shaped into a complete sphere and the diameter thereof was set to 40 μm. The microcapsule 141 was placed in a binder 145 and had a lower portion in contact with the lower electrode 131 and an upper portion separate from the upper electrode 132. The distance between the microcapsule 141 and the upper electrode 132 in the z-direction was set to 3 μm.

The inventors set electrical properties of a dispersion medium 142 filled in the microcapsule 141 and those of the binder 145, which was present outside (or around) the microcapsule 141 as described below.

Figure 3:
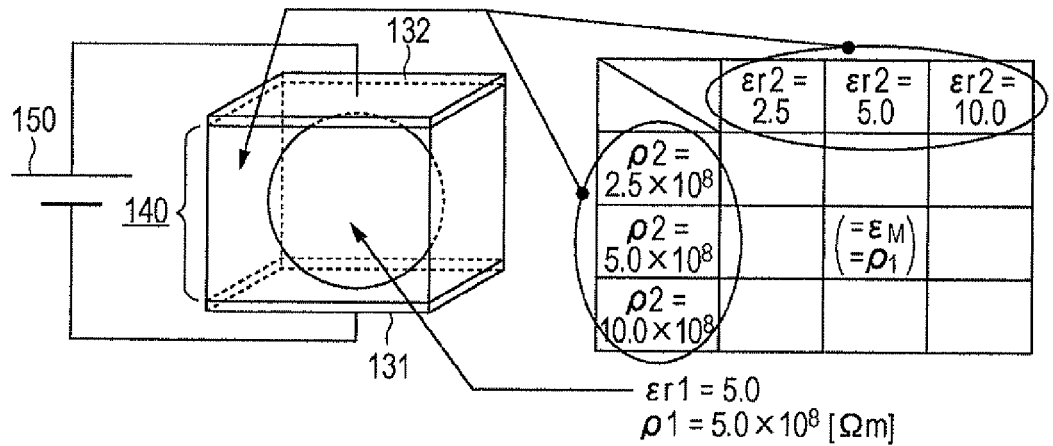
FIG. 3 is a graph showing set electrical properties of the microcapsule layer shown in FIG. 2A.

FIG. 3 is a graph showing set electrical properties of the microcapsule layer 140. In this simulation, the relative dielectric constant $\in$r1 and volume resistivity $\rho$1 of the dispersion medium 142 were set to 5.0 and 5.0×10$^8$ $\Omega$m, respectively, and the relative dielectric constant $\in$r2 and volume resistivity $\rho$2 of the binder 145 were set to nine levels around the above values as shown in FIG. 3. That is, the relative dielectric constant $\in$r2 of the binder 145 was set to three levels: 2.5, 5.0, and 10.0. The volume resistivity $\rho$2 of the binder 145 was set to three levels: 2.5×10$^8$ $\Omega$m, 5.0×10$^8$ $\Omega$m, and 10.0×10$^8$ $\Omega$m. These were combined into nine levels. Electrical properties ($\in$r2 and $\rho$2) of the binder 145 were set to vary between a plurality of conditions relative to electrical properties ($\in$r1 and $\rho$1) of the dispersion medium 142.

Such electrical properties can be achieved in such a manner that, for example, Materials (a) to (e) below are used to make up the microcapsule layer 140.

(a) Dispersion medium: a silicone solvent
(b) White particles: titanium oxide
(c) Black particles: titanium oxynitride
(d) Shells of microcapsules: a melamine or epoxy resin
(e) Binder: an acrylic solvent The inventors set a voltage waveform used in this simulation as described below.

Figure 4:
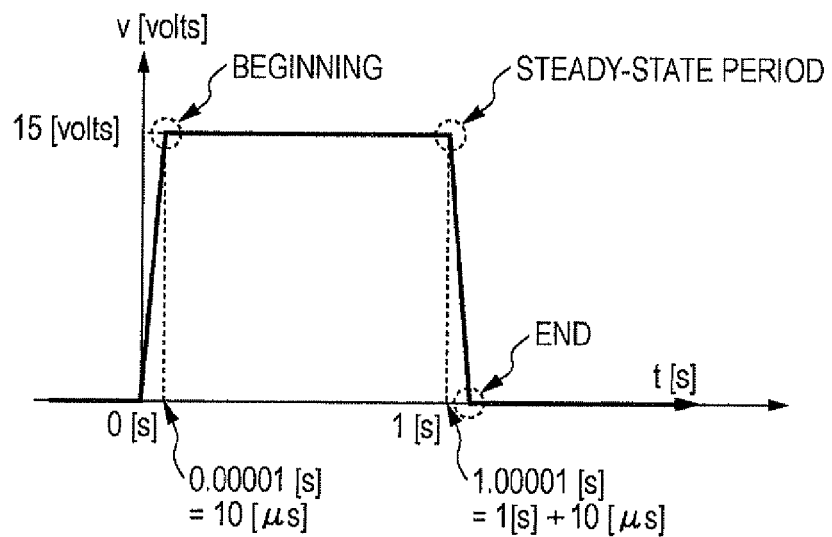
FIG. 4 is a graph showing the waveform of the voltage applied to the microcapsule layer shown in FIG. 2A.

FIG. 4 is a graph showing the waveform of the voltage applied to the microcapsule layer 140. In this simulation, the voltage waveform was set such that the voltage applied thereto rose to 15 V within 10 μs from t=0 s, maintained at 15 V to t=1 s, and fell to 0 V within 10 μs from t=1 s as shown in FIG. 4.

Under such settings, the inventors simulated the microcapsule layer 140 in such a manner that the upper electrode 132 and the lower electrode 131 were attached to a voltage-applying apparatus 150 as shown in FIG. 3 and the voltage waveform shown in FIG. 4 was applied to the microcapsule layer 140. The simulation results are described below.

(III) Beginning of Application of Voltage

Figure 5:
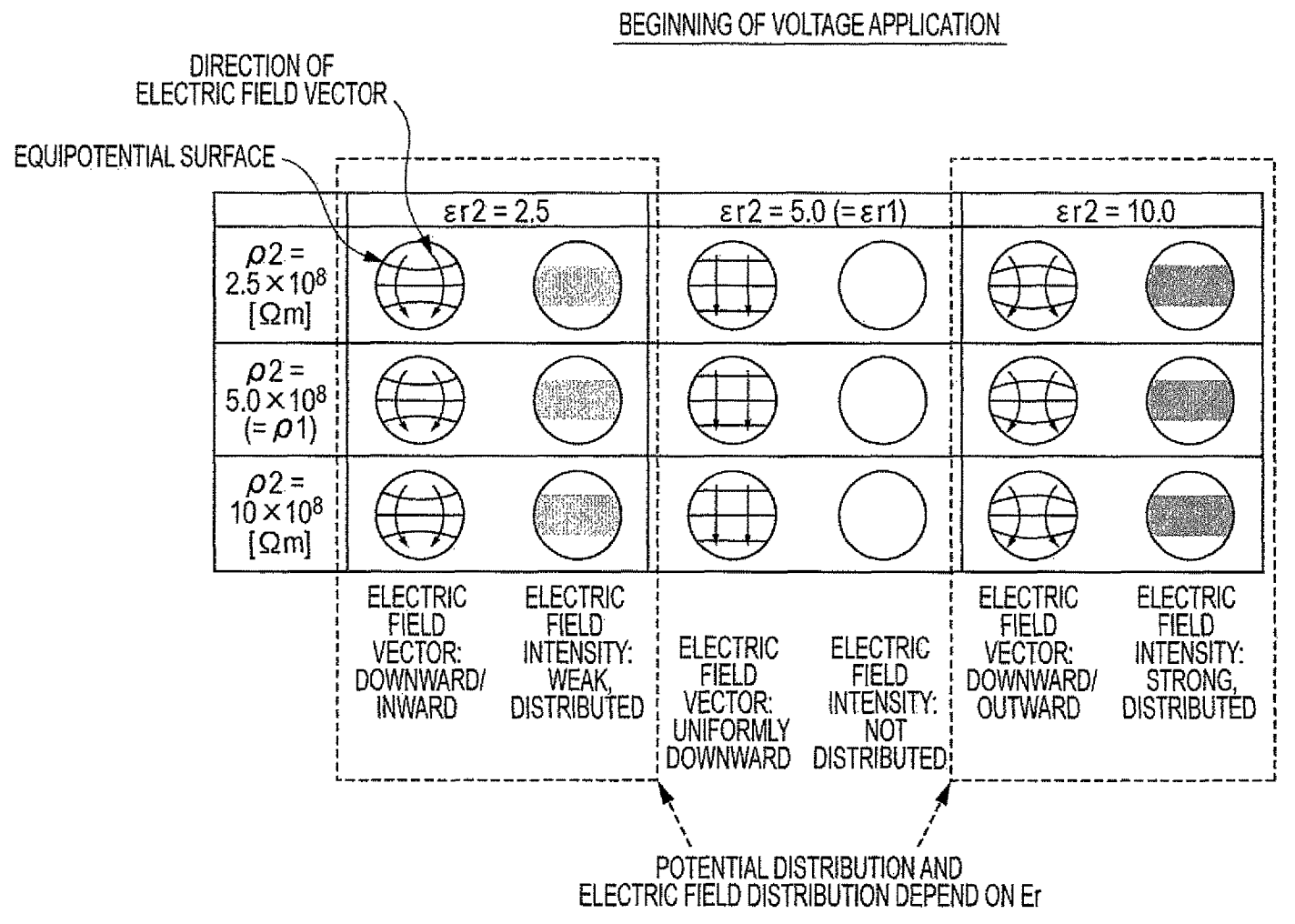
Figure 6:
FIG. 6 is a graph showing simulation results obtained in a steady-state period.

FIG. 5 is a graph showing results obtained by simulating the distribution of a potential and the distribution of the intensity (hereinafter also referred to as "electric field intensity") of an electric field vector at the beginning (t=10 μs) of the application of a voltage. The term "electric field vector" as used herein refers to a vector perpendicular to an equipotential surface. In FIGS. 5 to 7, each left column shows the potential distribution inside the microcapsule 141 (in particular, the potential distribution on a plane (that is, the center plane) which passes through the center of the microcapsule 141 and which is perpendicular to the lower and upper electrodes 131 and 132) and each right column shows the distribution of the electric field intensity inside the microcapsule 141 (in particular, the electric field distribution on a plane which passes through the center of the microcapsule 141 and which is perpendicular to the lower and upper electrodes 131 and 132).

FIG. 5 shows that the potential distribution and the electric field intensity distribution tend to depend on the dielectric constant at the beginning of the voltage application, that is, the difference ($\in$r2−$\in$r1) between the relative dielectric constant of the binder 145 and that of the dispersion medium 142 determines the potential distribution and the electric field intensity distribution.

In particular, the direction of the electric field vector and the electric field intensity tend to vary depending on Cases (a) to (c) below.

(a) For $\in$r2>$\in$r1

In a region above the center plane (that is, a region close to the upper electrode 132), the electric field vector points toward the center axis of the microcapsule 141. In a region below the center plane (that is, a region close to the lower electrode 131), the electric field vector points away from the center axis of the microcapsule 141 (that is, the electric field vector points outward). The electric field intensity inside the microcapsule 141 is greater than the electric field intensity of the binder 145 and is distributed in the center plane.

(b) For $\in$r2=$\in$r1

The electric field vector points uniformly downward. The electric field intensity inside the microcapsule 141 is substantially equal to the electric field intensity of the binder 145 and is not distributed in the center plane (that is, the electric field intensity inside the microcapsule 141 is uniform).

(c) For $\in$r2<$\in$r1

In a region above the center plane, the electric field vector points away from the center axis of the microcapsule 141. In a region below the center plane, the electric field vector points toward the center axis of the microcapsule 141 (that is, the electric field vector points inward). The electric field intensity inside the microcapsule 141 is less than the electric field intensity of the binder 145 and is distributed in the center plane.

(IV) Steady-State Period

FIG. 6 is a graph showing results obtained by simulating the potential distribution and the electric field intensity distribution in a steady-state period (t=1.0 s).

FIG. 6 shows that the potential distribution and the electric field intensity distribution tend to depend on the resistivity, that is, the difference (ρ2−ρ1) between the volume resistivity of the binder 145 and that of the dispersion medium 142 determines the potential distribution and the electric field intensity distribution.

In particular, the direction of the electric field vector and the electric field intensity tend to vary depending on Cases (a) to (c) below.

(a) For ρ2>ρ1

In a region above the center plane, the electric field vector points away from the center axis of the microcapsule 141. In a region below the center plane, the electric field vector points toward the center axis of the microcapsule 141 (that is, the electric field vector points inward). The electric field intensity inside the microcapsule 141 is less than the electric field intensity of the binder 145 and is distributed in the center plane.

(b) For ρ2=ρ1

The electric field vector points uniformly downward. The electric field intensity inside the microcapsule 141 is substantially equal to the electric field intensity of the binder 145 and is not distributed in the center plane (that is, the electric field intensity inside the microcapsule 141 is uniform).

(c) For ρ2<ρ1

In a region above the center plane, the electric field vector points toward the center axis of the microcapsule 141. In a region below the center plane, the electric field vector points away from the center axis of the microcapsule 141 (that is, the electric field vector points outward). The electric field intensity inside the microcapsule 141 is greater than the electric field intensity of the binder 145 and is distributed in the center plane.

(V) End of Application of Voltage

FIG. 7 is a graph showing results obtained by simulating the potential distribution and the electric field intensity distribution at the end (t=1.0 s+10 μs) of the application of a voltage.

FIG. 7 shows that the potential distribution and the electric field intensity distribution tend to depend on the product of the dielectric constant and the resistivity at the beginning of the voltage application, that is, the difference ($\in$r2·ρ2−$\in$r1·ρ1) between the product of the relative dielectric constant and resistivity of the binder 145 and that of the dispersion medium 142 determines the rest potential and the residual electric field.

In particular, the rest potential and the residual electric field tend to vary depending on Cases (a) to (c) below.

(a) For $\in$r2·ρ2>$\in$r1·ρ1

A rest potential and residual electric field having polarity opposite to that of an applied voltage are present.

(b) For $\in$r2·ρ2=$\in$r1·ρ1

No rest potential or residual electric field is present.

(c) For $\in$r2·ρ2<$\in$r1·ρ1

A rest potential and residual electric field having the same polarity as that of an applied voltage are present.

For Cases (a) and (c), although the voltage applied to the microcapsule 141 is zero, the clear rest potential and residual electric field are present in the microcapsule 141. This is very important in considering the retainability of electrophoretic displays. The case where the rest potential and the residual electric field have polarity and direction opposite to those of the voltage applied thereto leads to an increase in retainability; however, the opposite case is not preferable in retainability. The rest potential and the residual electric field (hereinafter also referred to as a residual potential) disappear finally (t→∞).

(VI) Conclusion

FIG. 8 is a graph showing guidelines, obtained from the simulation results, for selecting materials. In FIG. 8, the abscissa represents the ratio $\in$r2/$\in$r1 (=$\in$2/$\in$1) and the ordinate represents the ratio ρ2/ρ1.

The simulation results show that B and D shown in FIG. 8 are regions having "a uniform downward/inward (weak) electric field" during the voltage application and C and E shown in FIG. 8 are regions having "a uniform downward/outward (strong) electric field" during the voltage application. Furthermore, A, B, and C shown in FIG. 8 are regions where "a positive residual potential" is present at the end of the voltage application and D, E, and F shown in FIG. 8 are regions where "a negative residual potential" is present at the end of the voltage application.

According to the consideration of the inventors, Region C is most preferred, followed by Region A and Region B, and the binder 145 and the dispersion medium 142 preferably have electrical properties within these regions on the basis of an idea that a maximum electric field is applied to the microcapsule 141. Regions D, E, and F are not preferred. Regions D, E, and F cause a rest potential having polarity opposite to that of an applied voltage when no voltage is applied. Thus, in view of retention properties of electrophoretic displays, it is not preferred that the binder 145 and the dispersion medium 142 have electrical properties within Regions D, E, and F.

As described above, the inventors have simulated the temporal change (transient response) in electric field distribution by applying a square wave to a microcapsule layer. From the simulation results, the following guidelines can be provided: effective guidelines on electric material constants of materials for forming the microcapsule layer.

What is claimed is:

1. An electrophoretic display comprising:
   first electrodes;
   a second electrode placed opposite the first electrodes; and
   a microcapsule layer placed between the first electrodes and the second electrode,
   wherein the microcapsule layer contains microcapsules containing a dispersion medium and electrophoretic particles and a binder for retaining the microcapsules between the first electrodes and the second electrode, the electrophoretic particles are sealed in each microcapsule in such a state that the electrophoretic particles are dispersed in the dispersion medium, and the following inequality is satisfied:

$$(\rho2 \cdot \in2)/(\rho1 \cdot \in1) < 1 \quad (\alpha)$$

where ρ1 is the resistivity of the dispersion medium, $\in$1 is the dielectric constant of the dispersion medium, ρ2 is the resistivity of the binder, and $\in$2 is the dielectric constant of the binder.

2. The electrophoretic display according to claim 1, wherein the following inequality is satisfied:

$$\rho2/\rho1 < 1 \quad (\beta).$$

3. The electrophoretic display according to claim 2, wherein the following inequality is satisfied:

$$\in2/\in1 < 1 \quad (\gamma).$$

* * * * *